Aug. 13, 1929.　　　E. L. ACKERMAN　　　1,723,995
VENTILATOR
Filed Jan. 16, 1929
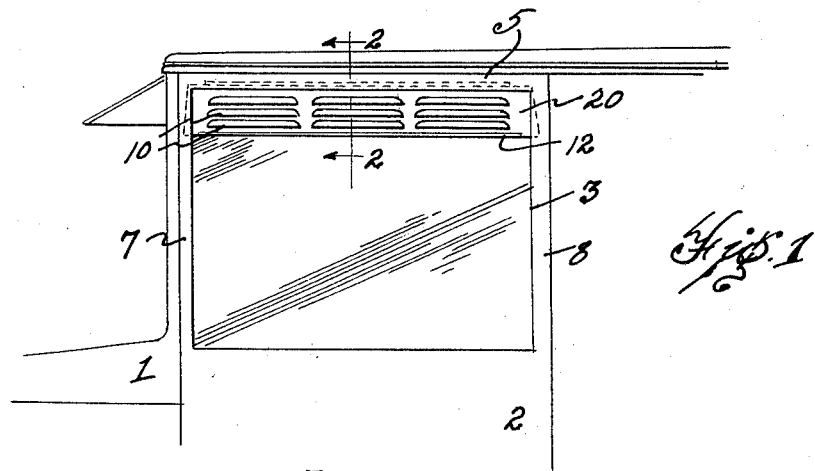
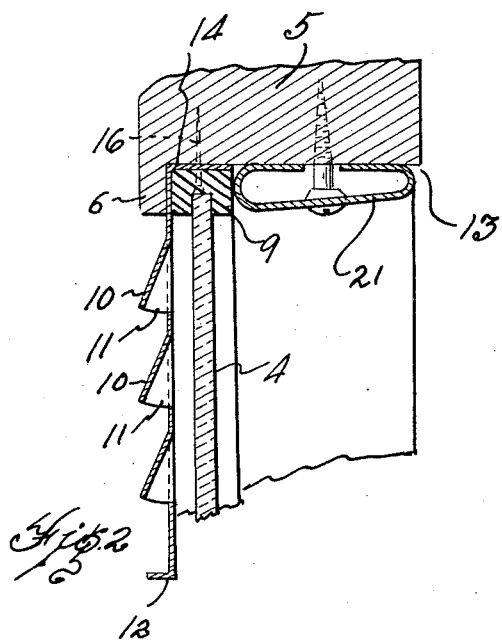
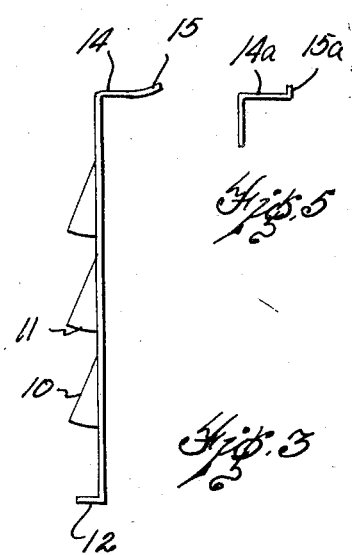
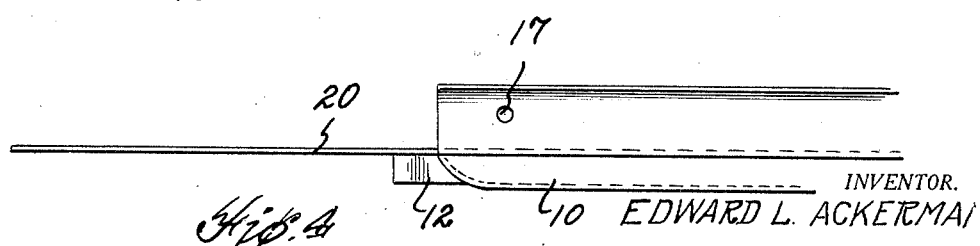
INVENTOR.
EDWARD L. ACKERMAN
BY
ATTORNEY.

Patented Aug. 13, 1929.

1,723,995

UNITED STATES PATENT OFFICE.

EDWARD L. ACKERMAN, OF DETROIT, MICHIGAN, ASSIGNOR TO ACKERMAN-BLAESSER-FEZZEY, INC., OF DETROIT, MICHIGAN, A CORPORATION OF MICHIGAN.

VENTILATOR.

Application filed January 16, 1929. Serial No. 332,855.

This invention relates to ventilators for automobile bodies, and its object is to provide a ventilator for mounting in the upper part of a window opening of a closed automobile body and one that is simple and inexpensive in form and is secured as a fixture at the top of the opening.

Ventilators for this purpose have heretofore been known and the principal feature of this invention resides in the formation of the ventilator of a sheet metal body positioned in vertical plane provided with louvres and a flange at the upper edge extending to one side and of such form that, in positioning the ventilator in the window opening, the vertical body portion of the ventilator is held under pressure against the frame preventing rattle and providing for free movement of the glass in opening or closing the window opening.

Other features of construction of a ventilator embodying my invention are hereinafter more fully described and a ventilator embodying my invention is shown in the accompanying drawings in which—

Fig. 1 is a view showing a portion of an automobile body with my improved ventilator applied to the window opening of the door.

Fig. 2 is a vertical section taken on line 2—2 of Fig. 1.

Fig. 3 is an end view of the ventilator showing its form previous to assembly in the window opening.

Fig. 4 is a plan view showing one end of the ventilator.

Fig. 5 shows an alternative form of construction.

I have shown in the drawing only a portion of an automobile body 1 having a door indicated diagrammatically at 2 and provided with a closable opening 3 with which a glass member 4 is used to close or open the same. The upper part of the door frame 5 is formed with a front depending flange like portion 6 and the side frames 7 and 8 of the frame are also to be understood as being formed with a recess to receive vertical guide strips similar to the upper horizontal guide strip 9 for the glass.

The ventilator is formed of flexible sheet metal and intermediate the ends thereof is provided with louvres 10 of which three rows are here shown. The louvres are stamped out of the body of the sheet forming outwardly and downwardly inclined portions providing inlets 11 for air and further providing means for preventing rain, sleet or snow from passing into the vehicle when the glass is down for the purpose of ventilation. These outwardly and downwardly extending faces of the louvres also prevent direct sunlight passing through these openings. These louvres are preferably formed to extend longitudinally of the body as indicated although the form and number and arrangement of the louvres is not an essential characteristic of this invention. However, in any louvre arrangement the body is extended at each end as indicated at 20 for a distance beyond the louvres to engage the side frames 7 and 8 of the door as indicated by dotted lines in Fig. 1.

The ventilator is positioned substantially parallel to the plane of the movement of the glass and the lower edge thereof is outturned at 12 providing a flange which will catch any water flowing therefrom and prevent its dripping into the window opening and also providing a convenient means for deflecting the water beyond the side of the automobile body. This member 12 is slightly less in length than the width of the ventilator opening as will be understood from Fig. 1 and the flange has a width approximately equal to the distance the lower edge of the louvre is spaced from the face of the body of the ventilator.

The sides of the window frame are at a right angle to the lower face 13 of the upper portion or cross bar 5 and an essential characteristic of this invention is in the provision of a flange 14 at the upper edge of the ventilator body of such form that, when the ventilator is in position as indicated in Fig. 2, a strain is imposed on the body of the ventilator tending to force the same outwardly and maintain it in contact with the side frames and portion 6 of the cross frame 5 to insure its being maintained out of the path of movement of the glass and to prevent rattle. The preferred form of construction of this flange 14 is shown in Fig. 3 is being formed at an angle to the body portion not greater than a right angle and provided with an upturned terminal edge 15. The flange is slightly curved in cross section to provide this upturned edge as shown in Fig. 3.

In assembling the ventilator in the window opening the guide strip 9 for the sash is placed as shown in Fig. 2 and screws 16 are used in the bottom of the glass receiving groove of the strip 9 passing through apertures of the flange as indicated at 17 in Fig. 4. Positioning of the screws 16 in place tends to a greater or less extent to flatten the flange 9 which causes an outward thrust on the vertical body portion of the ventilator. This pressure as previously stated, due to the spring like flexibility of the metal, is depended upon to prevent any looseness of the ventilator in use.

The same result can be obtained by the alternative form shown in Fig. 5 in which the flange 14ª extending across the upper edge of the ventilator body is provided with an upturned flange edge 15ª of short length. The angle between the flange and the body in this alternative form is not greater than a right angle and the upturned edge 15ª by reason of its contact with the lower face 13 of the cross flange 5 when in position in the window opening tends to force the vertical portion of the body to contact with the side frames. Thus, either form shown in Fig. 3 or Fig. 5 are productive of the same desired result in substantially the same way— that is, the flange itself is of such form in cross section that the body of the ventilator tends to be deflected outwardly to snug contact with the side frames of the ventilator opening.

In either of the forms shown the vertical and horizontal guide strips for the glass are located between a portion for the frame and the usual garnish strip such as the strip 21 shown in Fig. 2.

From the foregoing description it is evident that the ventilator shown and described may be used in any kind of an opening either such as in automobile bodies or building structures and enclosures for the cabins of motor boats, etc., the requirements in any of these instances of use being substantially the same.

Having thus briefly described my invention, what I claim and desire to secure by Letters Patent of the United States—

1. The combination with a window frame having an upper horizontal portion and substantially vertical side portions, the angle between the inner faces of said upper and side portions being practically ninety degrees, of a ventilator comprising a flexible sheet metal member having a body portion, the opposite ends of which engage the respective inner faces of the side portions of the frame, and a lateral flange at the upper edge of the body portion adapted to be forced to engagement with the upper horizontal portion of the frame, the angle between the said flange and body of the ventilator being not greater than ninety degrees, said flange having an upturned edge the angle between a line extending from the edge of the body to the upturned edge of the flange and the body portion being greater than ninety degrees providing a means whereby, in fastening the flange to the upper horizontal portion of the frame, the said body portion is thrust outwardly to snug contact with the side frames.

2. The combination with a window frame having an upper horizontal portion and substantially vertical side portions, the angle between the inner faces of the said upper and side portions being practically ninety degrees, of a ventilator comprising a flexible sheet metal member having a body portion formed with a series of louvres occupying the greater portion of the surface between the ends, the upper edge of the body portion having an inturned lateral flange terminating in an upturned edge, the angle between a line extending from the edge of the body to said upturned edge of the flange and the body portion being greater than ninety degrees, said flange being provided with apertures, and screws extending through the aperture into the inner face of the upper horizontal portion, the flange construction and relationship with the body of the ventilator being such that pressure exerted by the screws in fastening of the flange to said horizontal portion of the frame causes the said body portion to be thrust outwardly to engagement with the side portions of the frame.

3. The combination with a window frame having an upper horizontal portion and substantially vertical side portions, the angle between the inner faces of the said upper and side portions being practically ninety degrees, of a ventilator for the upper portion of the opening defined by the said frames comprising a flexible sheet metal member, the body portion of which is provided with a series of louvres and practically flat end portions, a lateral flange at the upper edge of the body portion adapted to engage the inner face of the upper horizontal frame portion, the face of the flange engaging the said face of the frame being concave in cross section for a portion of its width whereby an upturned edge of the flange is provided, the angle between a line extending from the edge of the body to said upturned edge of the flange and the body portion being greater than ninety degrees means for securing the flange to the inner face of the said upper horizontal frame tending to flatten the said flange whereby pressure outward is imposed upon the body portion causing the end portions thereof to engage the side frame members under pressure.

4. The combination with a window frame having a substantially horizontal upper cross member and substantially vertical side members defining an opening, said upper and side frame members having inwardly extending portions on the outer faces, the inner faces of which occupy substantially the same vertical plane and at substantially a right angle to the lower face of the upper cross member, of a ventilator adapted to be positioned in the upper part of the said opening consisting of a body member having a flat surface for engaging the said vertical faces of the frame members and provided with louvres in the portion of the member not in engagement with the said faces, said ventilator having a securing flange at the upper extremity to be secured to the lower face of the cross member, the angle between said flange and body of the ventilator being not greater than ninety degrees and the edge of the said securing flange being upturned, the angle between a line extending from the edge of the body to the upturned edge of the flange and the body portion being greater than ninety degrees providing a means whereby in fastening the ventilator in position the flange engages the lower face of the upper cross member at the said upturned edge and at the point of contact with the body causing an outthrust of the body portion against the said faces of the frame members occupying a vertical plane.

In testimony whereof, I sign this specification.

EDWARD L. ACKERMAN.